3,280,216
SELF-EXTINGUISHING EPOXY RESIN CONTAINING A HALOGENATED POLYNUCLEAR PHENOL AND A HARDENING AGENT
Alexander M. Partansky, Concord, Calif., assignor to The Dow Chemical Company, Midland, Mich., a corporation of Delaware
No Drawing. Filed Apr. 20, 1962, Ser. No. 188,936
15 Claims. (Cl. 260—831)

The invention relates to an improved epoxy resin composition which is curable to self-extinguishing products having high heat distortion properties and to the method of making such composition and product.

Epoxy resins, broadly, are well known and widely used. They are prepared, in general, (1) by reacting a halohydrin or epihalohydrin with a polyhydric compound, in the proper molar proportions, in the presence of a suitable catalyst, and dehydrohalogenating the chlorohydrin ether formed to produce substantially a corresponding diglycidyl ether or polyether of the initial polyhydric compound or (2) by reacting a diolefin or polyolefin, which may be cyclic or linear, with a peracid or peroxide to produce substantially a corresponding diepoxide or polyepoxide of the olefin. The epoxy resins so made are liquid or low-melting solids which are readily rendered curable to hard, durable, corrosion- and abrasion-resistant resins of the thermoset type by admixing therewith a curing agent selected from either (1) those which co-react, e.g., a primary or secondary amine or a dicarboxylic acid or the anhydride thereof, which enters into a cross-linking reaction with the oxirane groups, and also with the hydroxyl groups of the resin (if present) or (2) a catalyst which effects cross-linking directly between the functional groups of the epoxy resin, e.g., a Lewis acid such as $BF_3$ and organic complexes thereof, or a tertiary amine.

The cured resinous composition of the invention is self-extinguishing and exhibits high strength and thermal properties, as hereinafter more fully explained. It is well suited for casting, impregnating, encapsulating, laminating, and surface coating. It is made by a procedure which offers economic and technical advantages.

In the practice of the invention an epoxy resin, of the type prepared by reacting a polynuclear phenolic compound, having an average hydroxyl functionality greater than 2, with an epihalohydrin in the presence of an alkali metal hydroxide, is reacted with a specified molar proportion of a halogenated polynuclear phenol or mixture thereof, having an average hydroxyl functionality of at least 2, in the presence of a curing agent which may be either the catalytic type, e.g., a Lewis acid, an organic complex thereof, or a tertiary amine or a hardening agent of a co-reactant type, e.g., a dicarboxylic acid anhydride or a polyfunctional aliphatic or aromatic primary or secondary amine.

A method of preparing an epoxy resin of the type required for the practice of the invention is set out hereinafter.

As used herein, the term, polyphenol, denotes a polynuclear phenolic compound having either two, or an average of more than two, hydroxyphenyl groups per molecule. The term, halogenated polynuclear phenol, as used herein, denotes such polyphenolic compound having ring-attached bromine and/or chlorine. Other substituents, as hereinafter explained, may also be present on the hydroxyphenyl groups. The term, self-extinguishing, means not burning in the absence of an igniting source, i.e., the capacity of extinguishing any burning of itself in the absence of an exterior igniting source under the conditions defined by A.S.T.M. standard test D645–56T. S.E. herein means self-extinguishing.

The halogenated polynuclear phenolic compound may be any brominated and/or chlorinated phenolic compound containing at least 2 phenolic rings, e.g., any of the bisphenols or relatively low molecular weight novolacs containing sufficient bromine and/or chlorine substituents to impart self-extinguishing properties to the cured resinous composition.

The additional curing agents which are employed with the halogenated phenol to convert the epoxy novolac to a curable composition to give a highly cross-linked cured product may, as aforesaid, be either of the catalytic or the co-reactant type. Illustrative of suitable curing agents are tertiary amines such as benzyldimethyl amine, Lewis acids (and particularly amine complexes thereof such as $BF_3$:monoethylamine), dicarboxylic acid anhydrides such as maleic, phthalic, succinic, hexahydrophthalic, and polycarboxylic acid anhydrides such as pyromellitic dianhydride, methylamino-alkyl substituted aminophenols such as tridimethylaminomethyl phenol known as DMP–30, 1-cyanoguanidine (usually referred to as dicyandiamide or DiCY), and amides prepared by reacting dimerized or trimerized unsaturated fatty acids and a polyamide of which the Versamids are illustrative.

The manner of preparing the resin of the invention is best illustrated by the following general procedure:

The epoxylated polyphenol, e.g., an epoxy novolac, a halogenated binuclear or higher polyphenol, e.g., brominated or chlorinated 4,4'-isopropylidenediphenol, and a catalyst or co-reactant (as hereinafter more fully described) are admixed in a suitable vessel, preferably provided with heating, temperature control, and stirring means. When an auxiliary fire-retardant agent is desired, e.g., antimony oxide, it is admixed with the above reaction mixture at this time. A preferred mode of preparing the resin is to charge the vessel with the epoxylated polyphenol, heat it to a fluid condition, e.g., about 85° C., and promptly admix therewith the halogenated polyphenol and the catalyst or co-reactant (and thereafter the auxiliary fire-retardant agent, if desired). When the mixture is substantially homogeneous, it is cast or applied as a coating, impregnant, or the like and the thus cast, coated, or impregnated article subjected to an elevated temperature of between about 100° C. and about 210° C. for a time sufficient to effect a cure thereof to a hard durable resin composition. The time required for cure varies with the specific reactants and curing conditions employed.

The proportion of the halogenated polyphenol, as above defined, to the epoxy resin, as above defined, is such that between about 0.1 and about 0.45 equivalent weight of phenolic hydroxyl groups is provided by the halogenated polyphenol per equivalent weight of oxirane groups of the epoxy resin; preferably the proportion is between about 0.12 and about 0.3 equivalent weight of phenolic hydroxyls per equivalent weight of oxirane groups. The halogenated polyphenol must provide enough halogen to impart the desired self-extinguishing properties to the cured resin product. This has been found in the absence of any auxiliary S.E. components to require that the resinous composition contain at least about 10% bromine or at least about 18% chlorine or an intermediate value therebetween when both brominated and chlorinated polyhydroxy phenols are employed. Such intermediate minimum value is calculable and increases in direct proportion to the weight percent ratio of chlorinated phenol to brominated phenol employed. The minimum number of hydrogen atoms on each molecule of polyhydroxy phenol required to be substituted by bromine and/or chlorine is determined for a given phenol-epoxy resin reaction mixture by the halogen requirements for a self-extinguishing resin, as above explained.

Since not more than 0.45 phenol hydroxyl equivalent weight per oxirane equivalent weight is employed, at least half of the initial oxirane groups are available for reaction with a supplemental curing or hardening agent. The purpose of the supplemental agent is to complete cross-linking between the oxirane groups. The amount of supplemental curing or hardening agent added, therefore, varies depending not only upon the particular agent and the curing conditions employed, but also upon the proportion of phenolic hydroxyl equivalents provided by the halogenated phenol per oxirane equivalent in the reaction mixture.

When the curing agent is a catalytic type, e.g., $BF_3 \cdot MEA$, between about 0.5% and 5%, based on weight of the reaction mixture, is employed. When the curing agent is a co-reactant type, e.g., a primary or secondary polyamine or a dicarboxylic acid anhydride, the amount employed is usually calculated to supply a total of between about 0.8 and 1 times the stoichiometric quantity of curing agents necessary to react with the oxirane groups. To illustrate, a primary diamine (having two amino groups per molecule) is employed in an amount which provides about one-quarter or slightly less than one-quarter mole thereof for each equivalent weight of the oxirane groups in excess of those required to react with the halogenated polyphenol, whereas when a dicarboxylic acid anhydride is employed it is added in an amount which provides about one mole or slightly less than one mole thereof per equivalent weight of oxirane groups (present in excess of those required to react with the halogenated phenol present).

The invention may be practiced by admixing all the ingredients and casting the resulting mixture into a mold contoured to produce a desired shaped casting and allowing the thus cast mixture to set, at between about 100° and 210° C., preferably between about 140° C. and 200° C. for a time sufficient for the curing reaction to be substantially complete, about 2 to 24 hours usually conveniently being employed.

The resulting mixture may also be employed directly as a coating, encapsulating, impregnating, or laminating resin.

Alternatively, the final mixture may be partially pre-reacted in some applications. For example, in the preparation of pre-impregnated laminating materials a partial cure may be effected prior to the final assembly and curing of a laminated structure. It will be seen that the invention is useful in meeting divers needs employing a resinous composition and is applicable to a variety of manufacturing operations for which an epoxy type resin is desirable, possessing (in addition to desirable strength, flexibility, adhesion, and wear- and corrosion-resistant properties) self-extinguishing and high heat distortion properties.

In one embodiment of the invention, a supplemental fire-retardant additament may be employed. Among such additaments are antimony-, boron-, anr phosphorus-containing materials, including pigments. The supplemental additaments may be employed up to about 10% but the beneficial effect does not appear to be augmented by employing more than about 5%. When such additaments are employed in an amount to provide between about 2% and 5% by weight of the resin, the minimum amount of the bromine and/or chlorine required in the final resin may be lessened. For example, when the additament is antimony trioxide, the halogen requirements are reduced to about 6% by weight of bromine or about 10% by weight of chlorine, or a calculable intermediate percent when both brominated and chlorinated polyphenols are employed. Antimony oxide is the preferred supplemental fire-retardant additament to employ in the practice of the invention.

In one embodiment of the invention, only enough of the halogenated polyphenol is employed to provide the required amount of phenol ring-attached bromine or chlorine to impart self-extinguishing properties to the subsequently cured resin composition, and other di- or polyhydroxy phenolic compounds, having an average hydroxyl functionality of at least 2, are employed as a supplemental hydroxyl source to make up the maximum permissible overall proportion, i.e., not over 0.45 and preferably not over about 0.3 equivalent weight of phenolic hydroxyl groups per equivalent weight of oxirane groups of the epoxy resin. The novolac resins are particularly suitable for use as the nonhalogenated polyhydroxy phenol compound to employ.

The novolac resins (sometimes called merely novolacs), accordingly, may be employed in the practice of the invention, either or both as (1) the polyphenol which is epoxylated to prepare the epoxy resin (having an oxirane functionality of greater than two as required by the invention) or (2) upon halogenation, as the halogenated polyphenol, (either singly or in admixture with other halogenated or nonhalogenated polyphenols having an hydroxyl functionality of at least 2) to provide not more than a total of 0.45 equivalent weight of hydroxyl groups per equivalent weight of said oxirane groups in the epoxy resin in the practice of the invention. The novolac resins employed for use as either (1) or (2) above, in the examples hereinafter set out, were prepared by reacting a molar excess of phenol with formaldehyde in the presence of an acid catalyst and may be considered to have the formula:

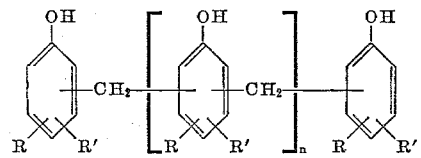

wherein $n$ may vary from an average greater than zero to about 4. In the practice of the invention, $n$ usually has an average value of from about 0.5 to 3.5, making the usual average total number of phenol groups per molecule from about 2.5 to 5.5. R and R' substituents are selected from the group consisting of hydrogen, chlorine, bromine, alkyl, aryl, aralkyl, and alkaryl hydrocarbons, at least a minimum of which, as aforesaid, must be bromine or chlorine. To provide such substituted novolac, a corresponding substituted phenol may be employed as the phenolic reactant with the formaldehyde in making the novolac. However, in preparing brominated novolac it is preferred to start with a non-brominated phenol and to brominate the novolac formed in the reaction with formaldehyde. Novolac resins are thermoplastic and, accordingly, may be remelted and employed in further reactions.

A novolac resin of the type above described may be epoxylated by any one of a number of known procedures, typically by reacting it with epichlorohydrin in the presence of an alkali metal hydroxide. The amounts of each reactant employed are such as to provide between 3 and 5 chemical equivalent weights of oxirane groups of the epichlorohydrin and an excess of about 5 percent chemical equivalent weight of the alkali metal hydroxide, per equivalent weight of hydroxyl groups present in the novolac. The temperature employed may be from about 40° to 150° C. but is usually between about 70° and 110° C. Usually, the novolac resin is dissolved in epichlorohydrin in a suitable reaction vessel and a 25–50 percent aqueous solution of NaOH or KOH is added thereto, usually over a period from 0.1 to 4 hours, accompanied by mild agitation. The reaction is exothermic and usually a reflux condenser with a separating type receiver is employed to aid in maintaining the desired temperature and to remove the excessive amount of water added with the caustic as well as that formed in the reaction. A partial vacuum may be used, if it is desirable to employ a temperature below the boiling point of epichlorohydrin. An epoxy novolac is thus produced which is subsequently separated from by-product salt formed in the reaction and from excess epichlorohydrin by conventional procedures, e.g., separating the salt by filtration and removing the excess epichlorohydrin by vacuum distillation. The resin may then also be water-washed and dried.

The epoxy novolac for use in the practice of the invention is assumed to have the formula:

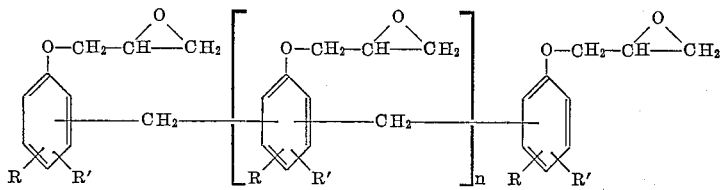

wherein $n$ has the same value and R and R' represent the same substituents as denoted in the novolac formula, supra.

To illustrate modes of practicing the invention and to show the presence of the desirably high strength and thermal properties in castings, as demonstrated by the high heat distortion temperature and Barcol hardness values obtained, a series of examples illustrative thereof was carried out. The procedure followed was substantially that set out hereinabove. The epoxylated polyphenol employed was an epoxy novolac having an average oxirane functionality of between 3.2 and 3.4. The halogenated polyphenol was tetrabromobisphenol A. The co-reactant or catalyst was varied in the different examples. In some examples, $Sb_2O_3$ was added as a supplemental fire-retardant. The specific co-reactant or catalyst and the amounts of all reactants, expressed in parts by weight per 100 parts of the epoxy novolac resin, are set out in Table I. Castings, ½″ x ½″ x 6″ in size, were then made by pouring the various compositions in molds which had been preheated to about 80° C. and heating the molds containing the compositions for the times and at the temperatures set out in Table I. The castings so made were then tested for heat distortion temperature and Barcol hardness. The test results are also shown in Table I.

Reference to Table I shows that the Lewis acid type catalyst, as illustrated by $BF_3$, adducted with monoethyl amine, gives the higher heat distortion temperature values. Further reference to the table also shows that as the equivalent ratio of hydroxyl groups to oxirane groups increases, the heat distortion temperature decreases when either the Lewis acid or tertiary amine is employed. From 0.1 to 0.2 equivalent weight of hydroxyl to oxirane groups appears preferable, as illustrated by Examples 3 to 7 and 16 to 18, when $BF_3$:MEA is employed as a supplemental curing agent within such ratio range, in contrast to the use of a larger equivalent ratio of hydroxyl to oxirane groups, as illustrated by Examples 8 to 10 and 19 to 21. The compositions of Examples 10, 12, 15, 21 and 23, wherein a ratio of 0.4 equivalent weight of hydroxyl to oxirane groups was employed, had substantially lower heat distortion temperatures, illustrative of the results obtained as the ratio of equivalents approaches the 0.45 maximum ratio of the invention. The Barcol hardness values show that satisfactory hardness is obtained by varying ratios of hydroxyl to oxirane groups within the practice of the invention.

For comparative purposes, castings were made following various procedures which were not in accordance with the invention. They are designated Runs A to L. Runs A and B employed the same epoxy novolac as the examples above, but employed as the polynuclear phenylhydroxy compound (instead of tetrabromobisphenol A) a novolac resin having an average molecular weight of 320 and average OH functionality per mole- TABLE I.—CASTINGS MADE ACCORDING TO THE INVENTION EMPLOYING AN EPOXY NOVOLAC, TETRABROMOBISPHENOL A AND EITHER A CATALYTIC OR CO-REACTANT TYPE OF CURING AGENT

| Example No. | Tetrabromobisphenol A | | Catalyst or Co-reactant Hardener | | $Sb_2O_3$ added in percent of total | Percent Bromine in Resin-hardener mixture | Curing Schedule, °C./Hrs. | H.D.T.,[3] °C. | Barcol Hardness |
|---|---|---|---|---|---|---|---|---|---|
| | PHR[1] | Equivalent Ratio[2] | Kind | PHR | | | | | |
| 1 | 20.5 | .134 | BF$_3$·MEA[4] / DiCY[5] | 1.7 / 3.5 | None / None | 9.9 | 180/18 | 195 | 44 |
| 2 | 20.5 | .134 | BzDMA[6] | 0.2 | None | 9.7 | 180/18 | 144 | 39 |
| 3 | 16.2 | .107 | BF$_3$·MEA | 3.5 | None | 8.0 | 150/2+180/16 | 204 | 46 |
| 4 | 16.2 | .107 | BF$_3$·MEA | 3.5 | 2.0 | 8.0 | 150/2+180/16 | 202 | 49 |
| 5 | 21.1 | .140 | BF$_3$·MEA | 3.6 | None | 10.0 | 150/2+180/16 | 198 | 48 |
| 6 | 21.1 | .140 | BF$_3$·MEA | 3.6 | 2.0 | 10.0 | 150/2+180/16 | 200 | 49 |
| 7 | 26.4 | .175 | BF$_3$·MEA | 3.8 | None | 12.0 | 150/2+180/16 | 183 | 48 |
| 8 | 35.3 | .233 | BF$_3$·MEA | 4.0 | None | 15.0 | 150/2+180/16 | 161 | 47 |
| 9 | 45.3 | .300 | BF$_3$·MEA | 4.3 | None | 18.4 | 150/2+180/16 | 160 | 47 |
| 10 | 60.4 | .400 | BF$_3$·MEA | 4.0 | None | 22.1 | 150/2+180/16 | 146 | 46 |
| 11 | 21.1 | .140 | BzDMA[6] | 2.0 | None | 10.0 | 150/2+180/16 | 147 | 36 |
| 12 | 60.4 | .400 | BzDMA[6] | 2.0 | None | 22.1 | 150/2+180/16 | 143 | 34 |
| 13 | 21.1 | .140 | BzDMA[6] | 2.0 | 2.4 | 10.0 | 150/2+180/16 | 161 | 40 |
| 14 | 35.3 | .233 | BzDMA[6] | 2.0 | 2.7 | 15.0 | 150/2+180/16 | 156 | 38 |
| 15 | 60.4 | .400 | BzDMA[6] | 2.0 | 3.2 | 22.1 | 150/2+180/16 | 145 | 39 |
| 16 | 16.2 | .107 | BF$_3$·MEA[4] | 3.5 | None | 8.0 | 150/2+180/4 | 203 | 50 |
| 17 | 21.1 | .140 | BF$_3$·MEA[4] | 3.6 | None | 10.0 | 150/2+180/4 | 195 | 49 |
| 18 | 26.4 | .175 | BF$_3$·MEA[4] | 3.8 | None | 12.0 | 150/2+180/4 | 181 | 50 |
| 19 | 35.3 | .233 | BF$_3$·MEA[4] | 4.0 | None | 15.0 | 150/2+180/4 | 167 | 49 |
| 20 | 45.3 | .300 | BF$_3$·MEA[4] | 4.3 | None | 18.4 | 150/2+180/4 | 152 | 49 |
| 21 | 60.4 | .400 | BF$_3$·MEA[4] | 4.0 | None | 22.1 | 150/2+180/4 | 138 | --- |
| 22 | 21.1 | .140 | BzDMA[6] | 2.0 | None | 10.0 | 150/2+180/4 | 129 | 36 |
| 23 | 60.4 | .400 | BzDMA[6] | 2.0 | None | 22.1 | 150/2+180/4 | 123 | 34 |
| 24 | 33.6 | .222 | MNA[7] / BzDMA | 63.9 / 0.82 | 1.66 | 12.0 | 180/18 | 168 | 44 |
| 25 | 27.9 | .185 | MA[8] / BzDMA | 36.0 / 0.82 | 1.66 | 12.0 | 180/18 | 161 | 46 |
| 26 | 19.3 | .128 | MDA[10] | 22.6 | 2.0 | 8.0 | [9] R+180/18 | 173 | 44 |

[1] PHR is parts by weight of hydroxy compound or catalyst per 100 parts of epoxy novolac resin having an average oxirane functionality per molecule of 3.2.
[2] Equivalent ratio refers to hydroxyl groups to oxirane groups present.
[3] H.D.T. is heat distortion temperature according to A.S.T.M. Test D. 648-56.
[4] BF$_3$·MEA is a 48/52 adduct of boron trifluoride with monoethylamine.
[5] DiCY is dicyandiamide.
[6] BzDMA is benzyldimethylamine.
[7] MNA is methyl nadic anhydride.
[8] MA is maleic anhydride.
[9] R, when it appears, means that the resin-phenol-hardener mixture was precured at room temperature (about 25° C.) overnight (about 16 hours) before being heated.
[10] MDA is 4,4'-methylene dianiline.

cule of 3.2, (which are satisfactory reactants) but were employed in an amount which is provided a ratio of hydroxyl to oxirane groups of about 1, in contrast to the permissible maximum ratio of not over 0.45, of the invention. BF$_3$·monoethylamine catalyst was employed as in the examples of Table I. Runs C to H employed the same epoxy novolac as in the examples but employed (as the polynuclear phenylhydroxy compound) both tetrabrominated bisphenol A and the novolac resin of Runs A and B to give a ratio of total hydroxyl to oxirane groups of greater than the 0.45 maximum ratio of the invention. The supplemental non-phenolic curing or hardening agents employed were as shown in Table II.

Runs I and J employed, as the epoxy resin, the diglycidyl ether of bisphenol A (instead of the epoxy novolac employed in the previous examples ond runs). It had an average oxirane functionality of between about 1.9 and 1.95. The hydroxyl compound employed was the novolac resin employed above. The amounts employed provided a ratio of equivalent weight of hydroxyl per equivalent weight of oxirane groups of about 1. BF$_3$·monoethylamine was the supplemental curing agent used. The results of the comparative runs are set out in Table II below.

The invention was further illustrated by examples wherein glass cloth laminates were prepared in accordance therewith. These examples employed a brominated polyphenol selected from brominated bis-phenol A, brominated novolacs, and mixtures thereof with epoxy novolacs in amounts to provide a proportion of between 0.109 and 0.270 hydroxyl equivalent weights per oxirane equivalent weight in the presence of sufficient catalyst or co-reactant supplemental curing agent. The components of the resulting curable mixtures are shown in Table III. The mixtures so made were then admixed with acetone to make 55% to 60% by weight total solids solutions having a viscosity of between about 35 and 40 centipoises.

Glass cloth, known as 181–Volan A, having an average thickness of 0.0085 inch, an average weight per square yard of 8.9 ounces, and a breaking strength of 350 pounds per inch, which had previously been treated with a chromate to enhance resin adhesion thereto, was cut into strips 6 feet long and 10 inches wide. The strips were drawn through the acetone resin solution and the excess solution removed therefrom by passing the strips between doctor rolls. The thus resin-treated strips were hung up for from 14 to 16 hours at room temperature (about 25° C.) to evaporate the solvent and

TABLE II

| Comparative Run Designation | Hydroxyl Compound | | | Catalyst [2] | | Percent Bromine | Curing Schedule, ° C./Hrs. | H.D.T., ° C. | Barcol Hardness |
|---|---|---|---|---|---|---|---|---|---|
| | Kind | PHR [1] | Ratio of Equivalents | Kind | PHR | | | | |
| A | 3.2 Novolac | 57.6 | 1.00 | BF$_3$·MEA | 0.1 | None | 180°/4 | 113 | 38 |
| B | 3.2 Novolac | 57.6 | 1.00 | BF$_3$·MEA | 1.0 | None | 180°/4 | 96 | 43 |
| C | Tetrabromobisphenol A | 47.0 | .307 | BzDMA | 1.8 | 15.1 | [3]R+180/18 | 137 | 38 |
| | Novolac | 33.7 | .580 | | | | | | |
| | Total | | .887 | | | | | | |
| D | Tetrabromobisphenol A | 38.0 | .248 | BzDMA | 1.8 | 12.6 | [3]R+180/18 | 138 | 37 |
| | Novolac | 38.0 | .642 | | | | | | |
| | Total | | .890 | | | | | | |
| E | Tetrabromobisphenol A | 30.1 | .196 | BzDMA | 1.7 | 10.3 | [3]R+180/18 | 145 | 37 |
| | Novolac | 40.4 | .694 | | | | | | |
| | Total | | .890 | | | | | | |
| F | Tetrabromobisphenol A | 22.8 | .150 | BzDMA | 1.6 | 8.2 | [3]R+180/18 | 145 | 37 |
| | Novolac | 40.2 | .690 | | | | | | |
| | Total | | .840 | | | | | | |
| G | Tetrabromobisphenol A | 38.0 | .248 | Tetramethyl Guanidine | 1.8 | 12.6 | R+180/18 | 135 | 38 |
| | Novolac | 37.4 | .642 | | | | | | |
| | Total | | .890 | | | | | | |
| H | Tetrabromobisphenol A | 23.9 | .156 | DiCY | 3.0 | 9.8 | 180/18 | 155 | 40 |
| | Novolac | 16.6 | .293 | | | | | | |
| | Total | | .449 | | | | | | |
| I [4] | Novolac | 59.0 | 1.00 | BzDMA | 1.0 | None | 180°/4 | 87 | 34 |
| J [4] | Novolac | 59.0 | 1.00 | BzDMA | 0.1 | None | 180°/4 | 81 | 40 |

[1] Parts by weight of hydroxyl compound or catalyst per hundred parts of the epoxy resin.
[2] See footnotes of Table I for full names of catalysts.
[3] Where R appears it means that the resin-phenol-hardener mixture was precured at room temperature (about 25° C.) overnight (about 16 hours) before being heated.
[4] In Runs I and J the epoxy resin employed was a commercial diglycidyl ether of Bisphenol A, known as DER 332, instead of the epoxy novolac used in other examples.

Reference to Table II shows that, as the ratio of equivalent weights of hydroxyl groups provided by the polynuclear phenol to the equivalent weights of oxirane groups increases in excess of the 0.45 maximum of the invention, the heat distortion temperature becomes increasingly less satisfactory. It also shows that an even lower and less satisfactory heat distortion temperature is obtained when a difunctional epoxy resin, e.g., D.E.R. 332 (rather than an epoxy resin having an oxirane functionality greater than 2) is used.

then precured for about 5 minutes at 125° C. in an oven. The strips were then cut into 10″ x 10″ squares and laminated into a 12-ply laminar structure according to conventional "nesting" procedure. The 12 ply assembly was then placed in a heat-controlled press between platens at sufficient pressure to bring the components of the laminar structures into firm mutual contact, and given a first cure at 150° C. for about 5 minutes; the laminate was then placed under a pressure of 100 p.s.i. and further cured at about 150° C. for from 17 to 30 minutes. The pressure was then released and the laminar structures were post-cured in an oven for 2 hours at 150° C. followed by 4 hours at 180° C. The percent of increase in weight of the Volan A glass cloth due to impregnated resin was about 35%. The laminates so made were then tested for flexural strength and modulus at both room temperature (about 25° C.) and either at 127° C. (260° F.) or about 149° C. (300° F.). 4-ply laminates were prepared in like manner and tested for self-extinguishment.

For comparative purposes, a laminate was also prepared employing hexachloroendomethylenetetrahydrophthalic anhydride (known as HET or chlorendic anhydride) as an S.E. curing agent instead of the brominated polyphenolic compound required by the invention. This run is designated Comparative Run K of Table III.

Resistance to solvents was also determined on the laminates of Examples 33 and 34 and Comparative Run L. The tests were run by weighing 1" x 3" x ⅛" of the laminates, immersing them in various solvents for measured periods of time, and removing, drying by blotting and reweighing them.

Reference to Table IV shows that the resistance to attack by boiling water, aqueous NaOH, and acetone, of the laminate of comparative Run L, was markedly less than the resistances of the laminates of the invention.

Having described my invention what I claim and desire to protect by Letters Patent is:

1. An epoxy resin composition curable to a self-extinguishing product having a high heat distortion temperature, hardness, and chemical resistance, consisting essentially of the reaction product of a glycidyl ether of a

TABLE III

| Example No. | Brominated Polyphenol | | | Catalyst or supplemental co-reactant hardening agent | | HDT | Percent Wt. Br | Percent Resin in Laminate | (1) | | (2) | | Interlaminar shear,[1] p.s.i. |
|---|---|---|---|---|---|---|---|---|---|---|---|---|---|
| | Kind | PHR[3] | OH equivalents per oxirane | Kind[4] | PHR | | | | Flexural strength, p.s.i. | Modulus, p.s.i. | Flexural strength, p.s.i. | Modulus, p.s.i. | |
| 27 | Tetrabromobisphenol A. | 27.3 | .179 | BF₃·MEA | 3 | 182 | 12.6 | 36.2 | 80,500 | 3.41 | *66,500 | 3.14 | 2,700 |
| 28 | ----do---- | 16.7 | .109 | BF₃·MEA | 3 | 203 | 8.4 | 38.8 | 78,900 | 3.00 | *63,600 | 2.87 | 2,360 |
| 29 | Novolac with 51% Br. | 31.6 | .270 | BF₃·MEA | 2 | 175 | 12.2 | 44.1 | 78,700 | 2.71 | 59,100 | 2.26 | 2,720 |
| 30 | ----do---- | 31.6 | .270 | DiCY[5] | 4 | | 12.2 | 47.1 | 71,600 | 2.45 | 52,700 | 2.02 | 2,820 |
| 31 | ----do---- | 25.0 | .214 | BF₃·MEA | 2 | 203 | 10.2 | 41.5 | 85,600 | 2.76 | 66,600 | 2.39 | 2,680 |
| 32 | ----do---- | 25.0 | .214 | DiCY | 4 | | 10.2 | 46.9 | 75,700 | 2.66 | 56,800 | 2.16 | 3,220 |
| Comparative Run | | | | | | | | | | | | | |
| K | HET anh.[7] | 100 | .480 | | | 226 | (8) | 43.2 | 86,300 | 2.96 | 24,200 | 1.01 | 4,000 |

[1] Between 22° and 25° C.
[2] At 260° F. except where asterisk appears when temperature was 300° F.
[3] PHR means Parts (by weight) per 100 parts of epoxy novolac.
[4] See footnotes of Table I for full descriptive terms for catalysts.
[5] When dicyandiamide was used, it was first dissolved in diethyl formamide.
[6] HET is hexachloroendomethylenetetrahydrophtahlic anhydride now widely used as a halogenated curing agent for S.E. epoxy resin compositions.
[7] In examples 27 and 28 elevated temperature tests were conducted at 300° F. instead of 260° F.
[8] 28% Cl.

Reference to Table III shows that laminates made with the resin composition of the invention had a flexural strength of not less than 75,700 p.s.i. at room temperature and not less than 52,700 at 260° F. Laminates employing 3% by weight of BF₃·monoethylamine as a catalyst showed not less than 63,600 p.s.i. at 300° F. Although the run employing HET anhydride (Run K) had good flexural strength when tested at room temperature, this value fell off to the low figure of 24,200 p.s.i. when tested at 260° F. 4-ply laminates, prepared from the same impregnated cloth as the laminates set out in Table III, and tested according to A.S.T.M Test D 135–56T were found to be self-extinguishing. Comparative Run K, however, although self-extinguishing as noted above, was unsatisfactory for the reason of low strength at elevated temperature.

TABLE IV

| Example No. or Comparative Run | Solvent Resistance, Expressed in Percent Weight Gain By Immersed Laminate | | | |
|---|---|---|---|---|
| | 2 hours in Boiling Water | 7 days in 10% aqueous NaOH | 7 days in Acetone | 7 days in "Skydrol"[1] |
| 33[3] | 0.113 | 0.145 | 0.016 | 0.043 |
| 34[3] | 0.116 | 0.157 | 0.036 | 0.050 |
| L[2] | 0.412 | 0.440 | 0.628 | 0.421 |

[1] "Skydrol" is an aeroplane brake fluid, comprising essentially dipropylene glycol.
[2] The laminate of comparative run L employed DiCY-cured epoxy novolac resin DEN 438; it had no self extinguishing property.
[3] Laminate compositions in examples 33 and 34 were identical with those in examples 27 and 28 described in Table III.

polynuclear phenolic compound having an oxirane functionality per molecule of more than 2, a halogenated polynuclear phenolic compound having an average hydroxyl functionality per molecule of at least 2, in an amount sufficient to provide an equivalent weight ratio of hydroxyl to oxirane groups of between about 0.1 and about 0.45 and, a supplemental hardening agent in an amount sufficient to effect cross-linking of substantially all the remaining oxirane groups, said halogenated polynuclear polyphenolic compound providing sufficient halogen to render the subsequently cured resin composition self-extinguishing.

2. The resin composition of claim 1 wherein the glycidyl ether of a polynuclear polyphenolic compound is an epoxy novolac having an average oxirane functionality of between about 2.5 and about 5.5.

3. The resin composition of claim 1 wherein the halogenated polynuclear phenolic compound is a brominated isopropylidenediphenol employed in an amount sufficient to provide at least about 10 percent bromine, by weight of the resulting curable mixture.

4. The resin composition of claim 1 wherein the halogenated polynuclear phenolic compound is a chlorinated isopropylidenediphenol in an amount sufficient to provide at least about 18 percent chlorine by weight of the resulting curable mixture.

5. The resin composition of claim 1 wherein the halogenated polynuclear phenolic compound is a novolac resin having an average hydroxyl functionality per molecule of between about 2.2 and about 6.0.

6. The resin composition of claim 1 wherein the self-extinguishing properties imparted to said resin are supplemented by an inorganic additament, in an amount of between about 0.5 and about 5.0 percent by weight of said resin, selected from the class consisting of compounds of boron, phosphorous, and antimony.

7. The resin composition of claim 1 wherein the supplemental hardening agent is a Lewis acid.

8. The resin composition of claim 7 wherein the Lewis acid is a $BF_3$·monoethanol amine complex present in an amount of between about 0.5 and about 5.0 weight percent of the composition.

9. The resin composition of claim 1 wherein the supplemental hardening agent is diciandiamide in an amount of between about 0.5 and about 5.0 weight percent.

10. The hard durable self-extinguishing epoxy resin consisting essentially of the composition of claim 1 after being subsequently subjected to heat at a temperature between about 100° and about 210° C. for from about 2 to about 24 hours.

11. The method of curing an epoxy resin containing an average of more than 2 oxirane groups per molecule consisting of admixing therewith a halogenated polynuclear phenolic compound containing at least 2 hydroxyl groups per molecule to provide a ratio of between about 0.1 and about 0.45 hydroxyl equivalent weights to oxirane equivalent weights, and a supplemental hardening agent selected from the class consisting of primary, secondary, and tertiary aliphatic and aromatic amines and mixtures thereof, Lewis acids and organic complexes thereof, and dicarboxylic acids and anhydrides thereof in sufficient amount to effect cross-linking among remaining oxirane groups and subjecting the resulting reaction mixture to a temperature between about 100° and about 210° C. until substantially all the oxirane groups present have reacted to provide a strong, hard, durable epoxy-type resin having a high heat distortion value, resistance to burning, and resistance to chemical attack.

12. The method according to claim 11 wherein the epoxy resin is an epoxy novolac, the halogenated polynuclear polyphenolic compound is selected from the class consisting of brominated binuclear phenolic compounds and brominated low molecular weight phenolic novolac resins and containing sufficient bromine atoms to render the subsequently hardened resin self-extinguishing according to A.S.T.M. Test D 135–56T, and the supplemental hardening agent is a Lewis acid in an amount between about 0.5 and about 5.0 percent of the reaction mixture.

13. The cured resin made according to the process of claim 12.

14. A flexible strong and durable laminated structure having high heat distortion temperature and fire-retardant properties consisting essentially of glass cloth laminae impregnated with and adhered together by the resin composition of claim 10.

15. The resin composition according to claim 1 wherein the halogenated polynuclear phenolic compound is present in an amount sufficient to provide a molar ratio thereof to the oxirane groups of between 0.1 and 0.3.

References Cited by the Examiner

UNITED STATES PATENTS

| 2,909,494 | 10/1959 | Parry et al. | 260—51 |
| 2,924,532 | 2/1960 | Dereich | 260—831 |
| 3,038,882 | 6/1962 | Gavlin et al. | 260—59 |
| 3,200,172 | 8/1965 | Renner | 260—831 |

FOREIGN PATENTS 869,495  11/1959  Great Britain.

OTHER REFERENCES

Skeist, Epoxy Resins, N.Y., Reinhold, 1958. TP 986 E6 S52.

Rubber and Plastic Age, May 1956 (page 290 relied on).

MURRAY TILLMAN, *Primary Examiner.*

LEON J. BERCOVITZ, *Examiner.*

E. J. TROJNAR, P. LIEBERMAN, *Assistant Examiners.*